(12) United States Patent
Kellner et al.

(10) Patent No.: US 10,784,544 B2
(45) Date of Patent: Sep. 22, 2020

(54) BATTERY MODULE FOR USE IN A HIGH-VOLTAGE ENERGY STORE

(71) Applicant: Dr. Ing. h.c. F. Porsche Aktiengesellschaft, Stuttgart (DE)

(72) Inventors: Philipp Kellner, Renningen (DE); Jens Bohlien, Stuttgart (DE); Dominik Klaiber, Neuhausen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 244 days.

(21) Appl. No.: 15/892,448

(22) Filed: Feb. 9, 2018

(65) Prior Publication Data

US 2018/0261897 A1    Sep. 13, 2018

(30) Foreign Application Priority Data

Mar. 7, 2017 (DE) ........................ 10 2017 104 710

(51) Int. Cl.
*H01M 10/6556* (2014.01)
*H01M 2/10* (2006.01)
*H01M 10/6567* (2014.01)
*H01M 10/6569* (2014.01)
*H01M 10/625* (2014.01)
(Continued)

(52) U.S. Cl.
CPC ..... *H01M 10/6556* (2015.04); *H01M 2/1077* (2013.01); *H01M 10/625* (2015.04); *H01M 10/647* (2015.04); *H01M 10/6567* (2015.04); *H01M 10/6569* (2015.04); *H01M 10/613* (2015.04); *H01M 10/6557* (2015.04); *H01M 2220/20* (2013.01)

(58) Field of Classification Search
CPC .......... H01M 10/6556; H01M 10/625; H01M 10/647; H01M 10/6567; H01M 10/6569; H01M 10/613; H01M 10/6557; H01M 2/1077; H01M 2220/20
See application file for complete search history.

(56) References Cited

U.S. PATENT DOCUMENTS 9,945,098 B2 * 4/2018 Adachi ................. E02F 9/0858
2011/0183177 A1 * 7/2011 Sohn ................... H01M 2/1077
429/120
(Continued)

FOREIGN PATENT DOCUMENTS

DE     102009040814 A1    3/2011
DE     102016113597 A1    2/2017
EP         2908377 A1     8/2015

*Primary Examiner* — Gregg Cantelmo
(74) *Attorney, Agent, or Firm* — Leydig, Voit & Mayer, Ltd.

(57) ABSTRACT

A battery module includes a battery module housing and a plurality of battery cells accommodated by the battery module housing. The battery module housing includes a main component for accommodating the battery cells and at least one additional component. The main component is of integral design and surrounds the battery cells from four sides. The additional component includes recesses for receiving a medium for temperature control. The recesses are closed by connecting the additional component to the main component to form media-carrying ducts. The main component is of open design on averted end sides. The battery cells are arranged at least substantially within the space which is surrounded by the main component.

23 Claims, 5 Drawing Sheets (51) Int. Cl.
*H01M 10/647* (2014.01)
*H01M 10/613* (2014.01)
*H01M 10/6557* (2014.01)

(56) References Cited

U.S. PATENT DOCUMENTS

| | | |
|---|---|---|
| 2011/0304297 A1* | 12/2011 | Sohn ............... H01M 10/46 320/107 |
| 2012/0227931 A1 | 9/2012 | Heckenberger et al. |
| 2014/0011059 A1 | 1/2014 | Hashimoto et al. |
| 2017/0047624 A1 | 2/2017 | Gunna et al. |

* cited by examiner

BATTERY MODULE FOR USE IN A HIGH-VOLTAGE ENERGY STORE

CROSS REFERENCE TO RELATED APPLICATIONS

This application claims benefit to German Patent Application No. DE 10 2017 104 710.7, filed Mar. 7, 2017, which is hereby incorporated by reference herein.

FIELD

The invention relates to a battery module for use in a high-voltage energy store of a vehicle which can be electrically driven.

BACKGROUND

High-voltage energy stores for vehicles which can be electrically driven require an efficient cooling arrangement.

It is known to use cooling ducts in the form of thin-walled extruded profiles for the purpose of cooling large underfloor batteries. Said cooling ducts are complicated to produce and expensive. Moreover, they have to be pressed and/or adhesively bonded onto a bulkhead plate or onto battery modules. This results in a non-optimum cooling effect since the cooling medium reaches the bulkhead plate or the battery modules only via the walls of the cooling ducts and an adhesive film.

EP 2 908 377 A1 discloses a battery module which has the features of the preamble of patent claim 1. Said battery module has a lower battery module housing which serves to accommodate a plurality of battery cells. The battery module housing is of flattened design in the region of a base on its bottom side. A plate which is additionally provided is provided, on a top side, with recesses for receiving a medium for temperature control. The battery module housing is placed onto the plate in the region of the base of said battery module housing. When the plate is connected to the battery module housing, the recesses in the plate are closed to form media-carrying ducts.

DE 10 2009 040 814 A1 describes an energy store holder for a vehicle. Here, a cooling plate with exposed cooling ducts is connected to a holding unit, as a result of which the cooling ducts are closed.

SUMMARY

In an embodiment, the present invention provides a battery module. The battery module includes a battery module housing and a plurality of battery cells accommodated by the battery module housing. The battery module housing includes a main component for accommodating the battery cells and at least one additional component. The main component is of integral design and surrounds the battery cells from four sides. The additional component includes recesses for receiving a medium for temperature control. The recesses are closed by connecting the additional component to the main component to form media-carrying ducts. The main component is of open design on averted end sides. The battery cells are arranged at least substantially within a space which is surrounded by the main component.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the present invention provide battery modules that provide for efficient cooling of battery cells accommodated by the battery module housing. Embodiments of the present invention achieve such efficient cooling of battery cells with a particularly simple configuration in terms of construction and simple production of the battery module housing.

Embodiments of the present invention provide battery modules that have battery module housings that include a main component for accommodating a plurality of battery cells and an additional component having recesses for receiving a medium for temperature control. Here, the recesses are closed by connecting the additional component to the main component to form media-carrying ducts. The main component is of integral design and surrounds the battery cells from four sides. The main component is of open design on averted sides, and the battery cells are arranged at least substantially within the space which is surrounded by the main component. In an embodiment of the battery module, the main component has load paths. Load path-forming walls of the main component have wall thicknesses which are increased in comparison to non-load path-forming walls of the main component.

Therefore, owing to the arrangement of the additional component on the circumferential sides of the main component, particularly good temperature control is ensured with simple configuration of the battery module housing.

It is considered to be particularly advantageous when the additional component has a low thermal conductivity, in particular a considerably lower thermal conductivity than the main component. Therefore, the heat which is generated by the battery cells is dissipated by means of the main component in a particularly effective manner.

It is considered to be particularly advantageous when the additional component is integrated into the main component. This is performed, in particular, in such a way that the wall thickness of the main component is reduced in the region of the additional component, and the wall thickness of the additional component, in the duct-free regions of said additional component, corresponds to the reduction in thickness of the main component.

The main component preferably does not have any recesses for receiving the medium. This allows the main component to be produced in a particularly simple manner.

The main component is composed of, in particular, light metal. Said light metal is preferably aluminum or an aluminum alloy.

In particular, it is provided that the main component is an extruded profile. Accordingly, the main component can be produced in a simple and cost-effective manner.

In a preferred embodiment, it is provided that the battery module has lateral, upper and lower wall sections, wherein the main component forms these wall sections.

In particular, it is provided that the main component separates an interior space of the battery module, in which the battery cells are arranged, from the medium for temperature control. Here, the main component is a thermal conductor.

The additional component is preferably composed of light metal. Said light metal is, in particular, aluminum or magnesium or an aluminum alloy or a magnesium alloy.

If the main component and/or the additional component are/is composed of metal, the respective component is produced, in particular, by means of stamping, cold extrusion, forging, deep-drawing, milling or casting.

As an alternative, the additional component is composed, for example, of plastic or fiber-reinforced plastic. With this choice of material, the additional component is produced, in particular, by means of pressing, injection-molding or forming.

The additional component is preferably configured in such a way that it has a duct geometry which is optimized in terms of flow and temperature control and has deflections. In principle, the ducts can be provided such that no deflection takes place, and therefore the inflow and outflow of the temperature-control medium are arranged on opposite sides of the battery module. As an alternative, it is provided that the inflow and outflow of the temperature-control medium are arranged on the same side of the battery module. In particular, deflections in the additional component allow deflection of the temperature-control medium through 180°, so that said arrangement of the inflow and outflow on the same side of the battery module can be implemented in a simple manner.

The main component and the additional component can be connected in different ways: by way of example, the main component and the additional component can be connected to one another in a cohesive manner and/or in a micro-interlocking manner. The main component and the additional component can be welded to one another and/or adhesively bonded to one another. Specifically, the main component and the additional component can be adhesively bonded to one another by means of a film-type adhesive, in particular a pasty or sprayable adhesive. The adhesive is preferably an elastomer or a thermoset, in particular epoxy resin, or a thermoplastic.

According to one preferred embodiment, the battery module housing has the ducts in one wall section or both lateral wall sections of the battery module housing. In alternatively preferred embodiments, the battery module housing has the ducts in an upper and/or lower wall section of the battery module housing.

It is considered to be particularly advantageous when the battery module housing is closed by means of separate end plates. This configuration allows particularly simple configuration and production of the battery module housing which can be produced without end-side closure components, wherein the closure in the region of the averted end sides of the main component is performed by the separate end plates in this case. It is provided in particular that the battery module housing is closed by means of end plates, which are arranged in the region of averted end sides of the battery module housing, to form a cuboidal whole body.

It is considered to be particularly advantageous when connections and/or deflections for the ducts are integrated into the end plates.

The battery module housing can have, for example, water, a water/glycol mixture, evaporating coolant, oil or another liquid as the medium for temperature control.

A battery module, in particular a battery module of the kind which is defined in connection with the above-described embodiments, is used, in particular, in a high-voltage energy store. Said high-voltage energy store of a vehicle which can be electrically driven comprises, in particular, a battery box and a plurality of battery modules which are accommodated by the battery box.

The particular advantages of the battery modules and, respectively, of the high-voltage energy stores of embodiments of the present invention include improvement in cooling efficiency, functional integration, reduction in weight and costs, and also low space requirement.

Figure 1:
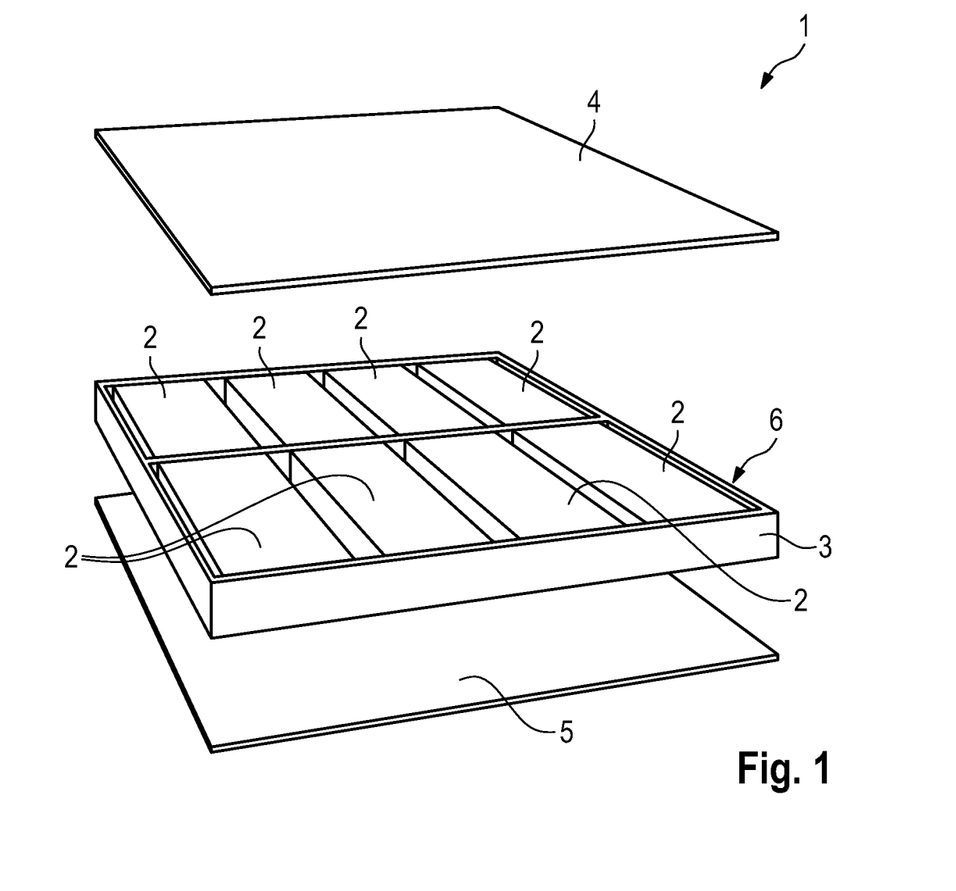
FIG. 1 shows an exploded illustration of a high-voltage energy store with a battery box and various battery modules which are surrounded and accommodated by the battery box.

FIG. 1 shows a high-voltage energy store 1 for use in a vehicle which can be electrically driven. The high-voltage energy store 1 has a battery box and a plurality of battery modules 2 which are accommodated by said battery box. The battery box has a central battery frame structure 3 and also a battery housing cover 4 and a battery housing base 5. When the battery housing base 5 is connected to the battery frame structure 3, this arrangement accommodates the battery modules 2. The arrangement is then closed by means of the battery housing cover 4. Said figure shows eight battery modules 2 which are accommodated by the battery box. Said battery modules 2 are of identical design. Each battery module 2 at least comprises a battery module housing 6 and a plurality of battery cells 7, not illustrated in said FIG. 1, which are surrounded/accommodated by the battery module housing 6.

FIGS. 2 to 9 illustrate battery modules 2 with four different preferred exemplary embodiments of battery module housings 6. In said battery modules, the respective battery module housing 6 has a main component 8 for accommodating a plurality of battery cells 7, specifically seven battery cells 7 illustrated in said figures, and at least one additional component 9. Said additional component 9 has recesses 10 for receiving a medium for temperature control. The recesses 10 are closed by connecting the additional component 9 to the main component 8 to form media-carrying ducts 11. The main component 8 is of integral design and surrounds the battery cells 7 from four sides. The main component 8 has the additional component 9 at least in the region of one of the four sides which surround the battery cells 7.

The additional component 9 has a considerably lower thermal conductivity than the main component 8. The additional component 9 is integrated into the main component 8 in such a way that the wall thickness of the main component 8 is reduced in the region of the additional component 9, and the wall thickness of the additional component 9, in the duct-free regions of said additional component, corresponds to the reduction in thickness of the main component 8. The main component 8 does not have any recesses for receiving the medium. The main component 8 is composed of light metal, in particular aluminum, and is designed as an extruded component. Therefore, the battery module housing 6 has two lateral wall sections 12, 13, an upper wall section 14 and a lower wall section 15, wherein the main component 8 forms these wall sections.

The additional component 9 is composed of light metal, preferably of aluminum. Said additional component is preferably produced by means of stamping, cold extrusion, forging, deep-drawing, milling or casting, just like the main component 8.

Alternative production methods are likewise advantageous, particularly with respect to the additional component 9. If the additional component 9 is composed of plastic or fiber-reinforced plastic, production of the additional component 9 by means of pressing, injection-molding or forming is considered to be advantageous.

The parts main component 8 and additional component 9 which represent the separate components are preferably connected in a cohesive manner and/or in a micro-interlocking manner. The connection can be made by welding and/or adhesive bonding to one another. In particular, the main component 8 and the additional component 9 are adhesively bonded to one another by means of a film-type adhesive. Said film-type adhesive is, in particular, a pasty or sprayable adhesive. The adhesive is, for example, an elastomer or a thermoset, in particular epoxy resin, or a thermoplastic.

Figure 2:
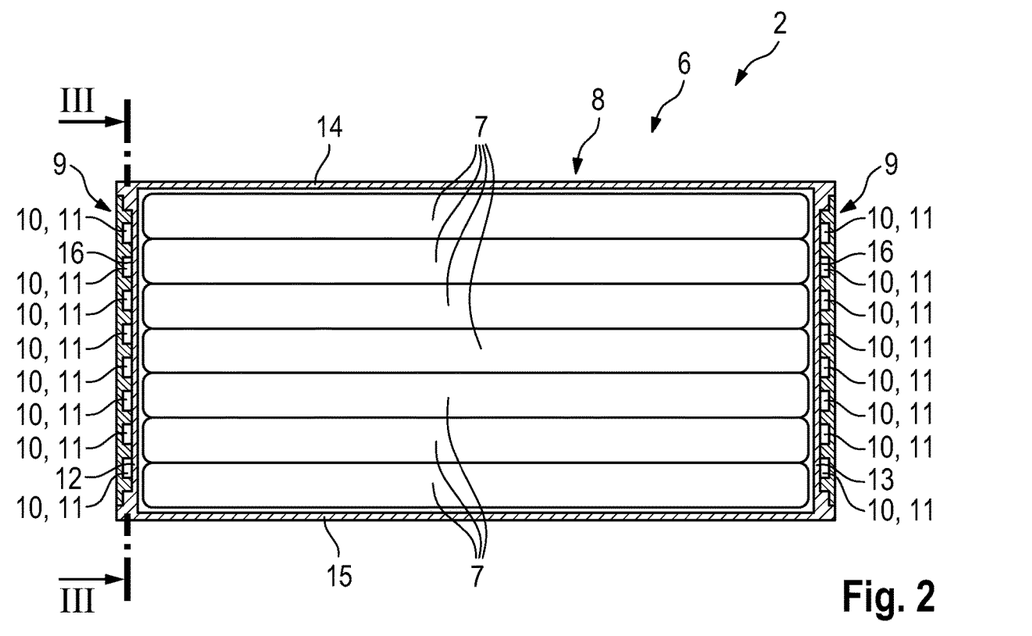
FIG. 2 shows a sectional illustration according to line II-II in FIG. 3 of a first exemplary embodiment of a battery module with temperature control integrated laterally into a battery module housing.
Figure 3:
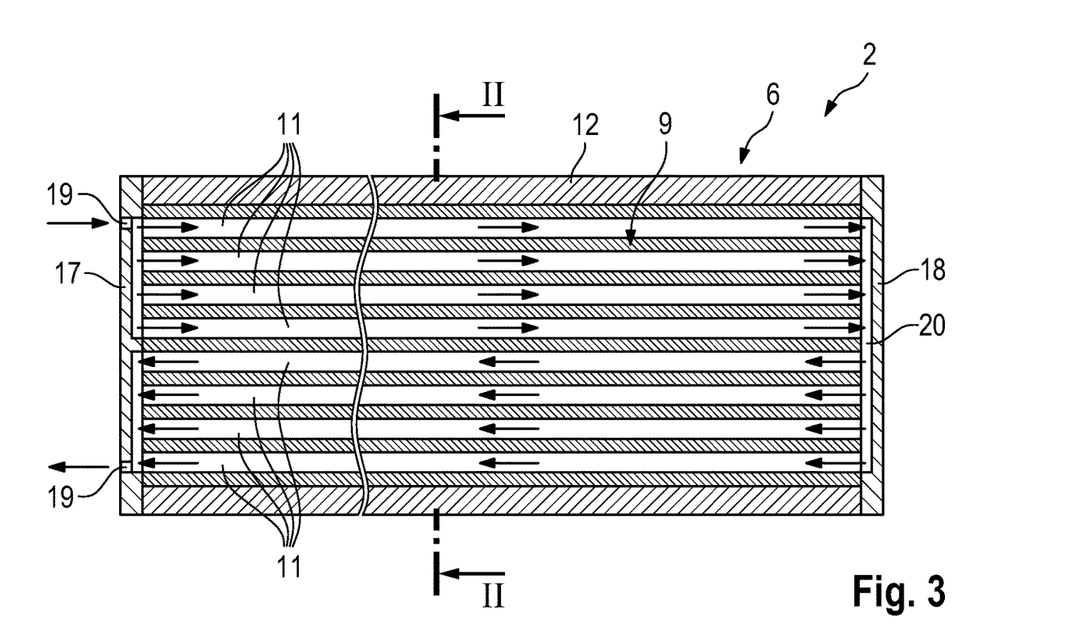
FIG. 3 shows a sectional illustration according to line in FIG. 2 of the first exemplary embodiment of a battery module.

The four preferred exemplary embodiments are explained in more detail in the text which follows:

A battery module 2 in which the battery module housing 6 is designed with integrated temperature control on both sides is illustrated in the first exemplary embodiment according to FIGS. 2 and 3. Said figures show a rectangular profile cross section with the two lateral wall sections 12, 13, the upper wall section 14 and the lower wall section 15. The wall sections are designed with approximately the same wall thickness. However, a recess 16 for inserting the additional component 9 which is associated with said recess is in each case provided in the region of the wall sections 12 and 13, as seen from the outside of the battery module housing 6. The respective additional component 9 has, on a main side, a plurality of recesses 10, specifically eight recesses 10, which are arranged parallel in relation to one another and horizontally and extend over the entire length of the additional component 9 and for all intents and purposes over the entire length of the main component 8. If the respective additional component 9, with its recesses 10 facing the associated wall section 12 or 13, is inserted into an associated recess 16 of the main component 8, the recesses 10 of the additional component 9 are closed by connecting the main component 8 and the additional component 9, so as to form the media-carrying ducts 11.

In each case eight ducts 11 are arranged in the region of the lateral wall section 12 or 13. Since these ducts 11 are provided in the region of the lateral wall sections 12, 13, they each have an extent in the vertical direction which is considerably greater than in the width direction of the respective wall section 12, 13. The extent of the lateral wall sections 12, 13 in the vertical direction is lower than that of the wall sections 14, 15 in the width direction. Said extent is approximately half.

As can be seen in the illustration of FIG. 3, the battery module housing 6 or the main component 8 is closed by means of separate end plates 17, 18 in the region of the averted end sides, and these parts therefore form a cuboidal arrangement.

Two connections 19 are integrated into the end plate 17, wherein one connection serves to supply the relatively cold medium and this medium which is then heated is discharged through the other connection 19. The other end plate 18 has deflections 20 for deflecting the medium through 180°.

The medium provided is, for example, water, a water/glycol mixture, evaporating coolant, oil or another liquid.

Figure 4:
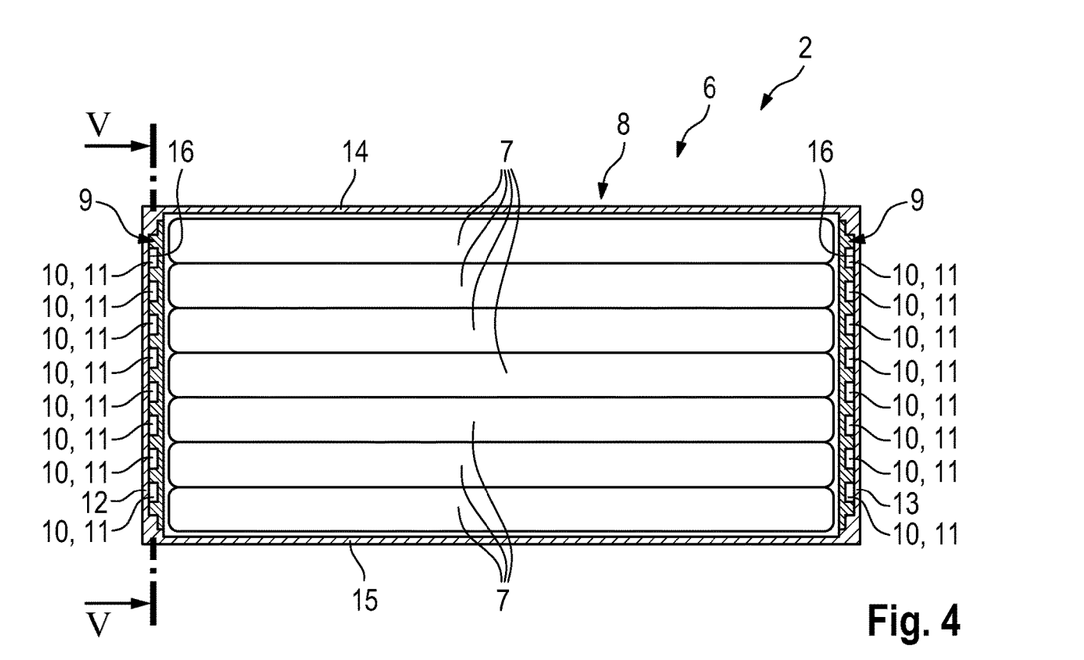
FIG. 4 shows a sectional illustration according to line IV-IV in FIG. 5 of a second exemplary embodiment of a battery module with temperature control integrated laterally into a battery module housing.
Figure 5:
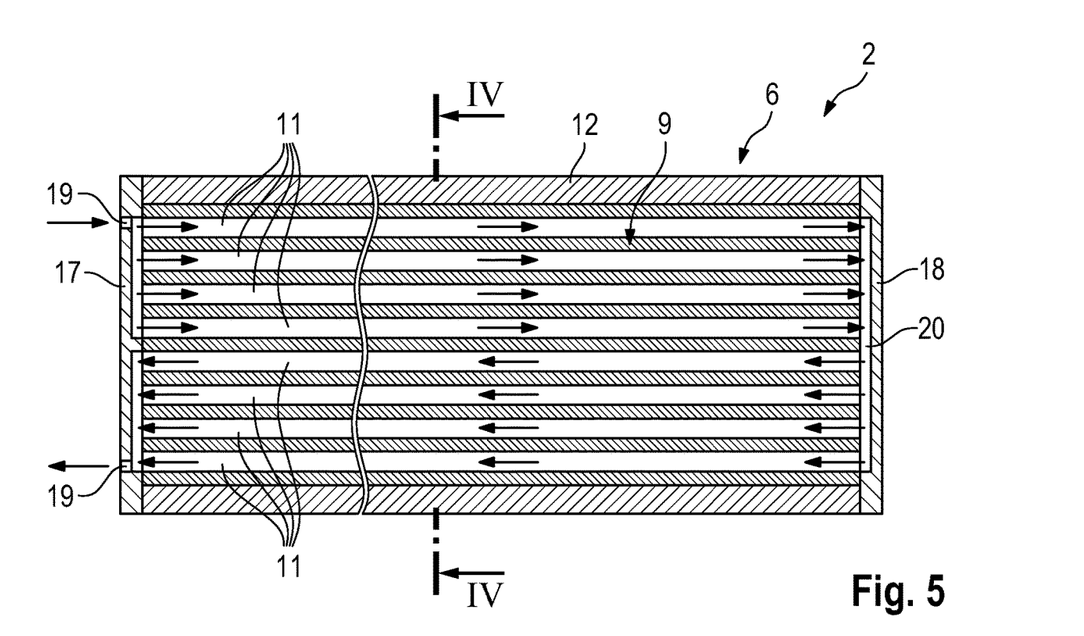
FIG. 5 shows a sectional illustration according to line V-V in FIG. 4 of the second exemplary embodiment of a battery module.

In the case of the second exemplary embodiment according to FIGS. 4 and 5, two additional components 9 are likewise provided in the region of the lateral wall sections 12, 13 of the battery module housing 6 or of the main component 8. However, the respective wall section 12 or 13 does not have the recess 16 for accommodating the additional component 9 on its outer side, but rather on its inner side. The described end plates 17 and 18 are provided in this exemplary embodiment too, and also in the further exemplary embodiments discussed in the text which follows.

Figure 6:
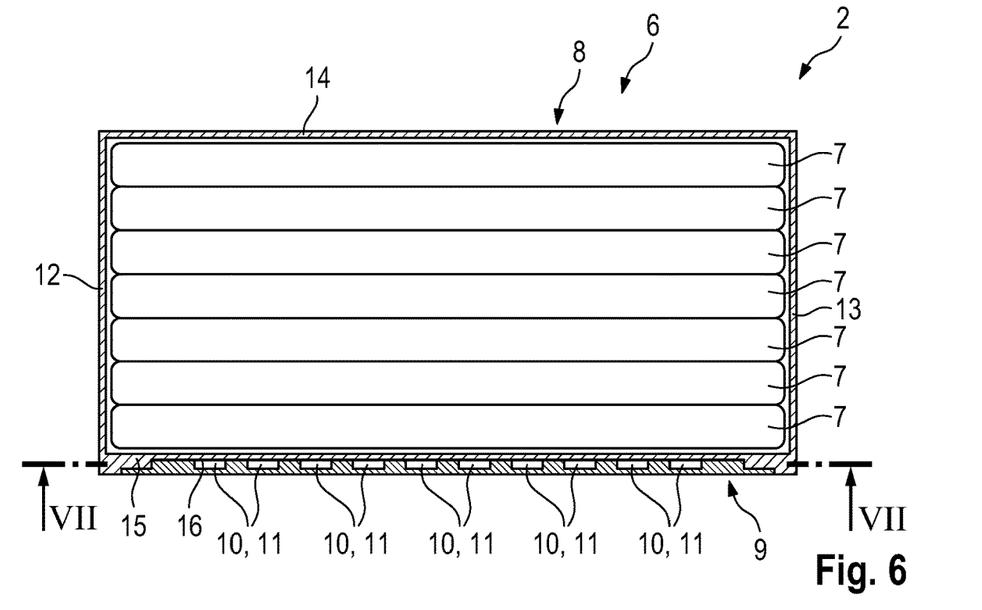
FIG. 6 shows a sectional illustration according to line VI-VI in FIG. 7 of a third exemplary embodiment of a battery module with temperature control integrated laterally into a battery module housing.
Figure 7:
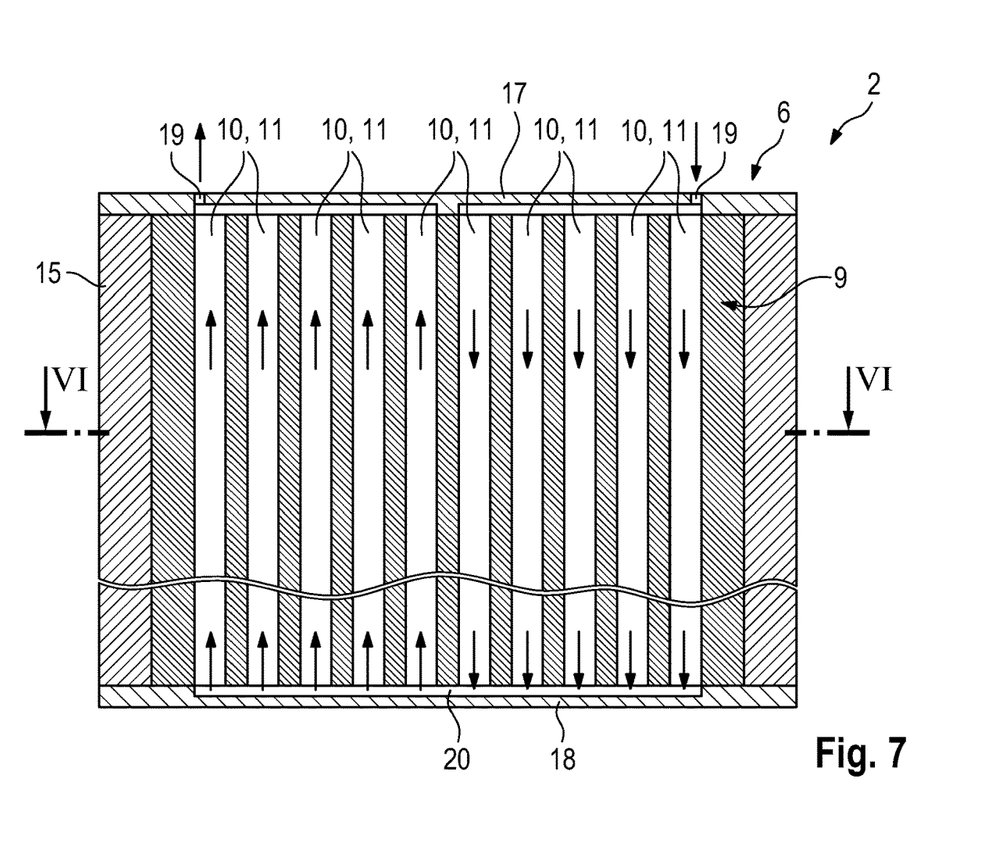
FIG. 7 shows a sectional illustration according to line VII-VII in FIG. 6 of the third exemplary embodiment of a battery module.

In the case of the third exemplary embodiment according to FIGS. 6 and 7, an additional component 9 is associated with the battery module housing 6 only in the region of the lower wall section 15 of said battery module housing. The battery module housing 6 has the recess 16 on the outside in the region of the wall section 15, so that the additional component 9 is fitted from the outside, in accordance with the first exemplary embodiment. The additional component 9 has ten recesses 10.

Figure 8:
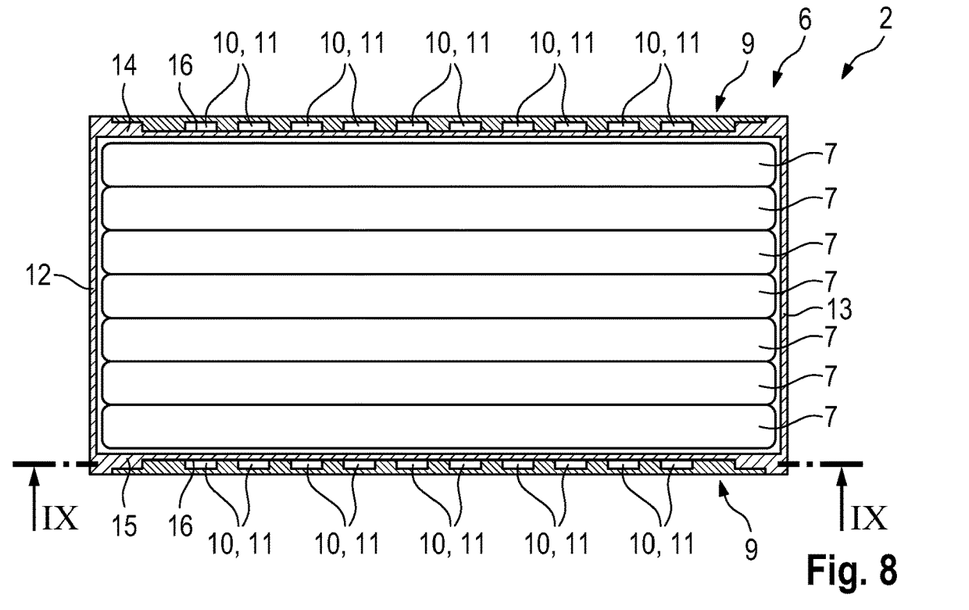
FIG. 8 shows a sectional illustration according to line IX-IX in FIG. 8 of a fourth exemplary embodiment of a battery module with temperature control integrated laterally into a battery module housing.
Figure 9:
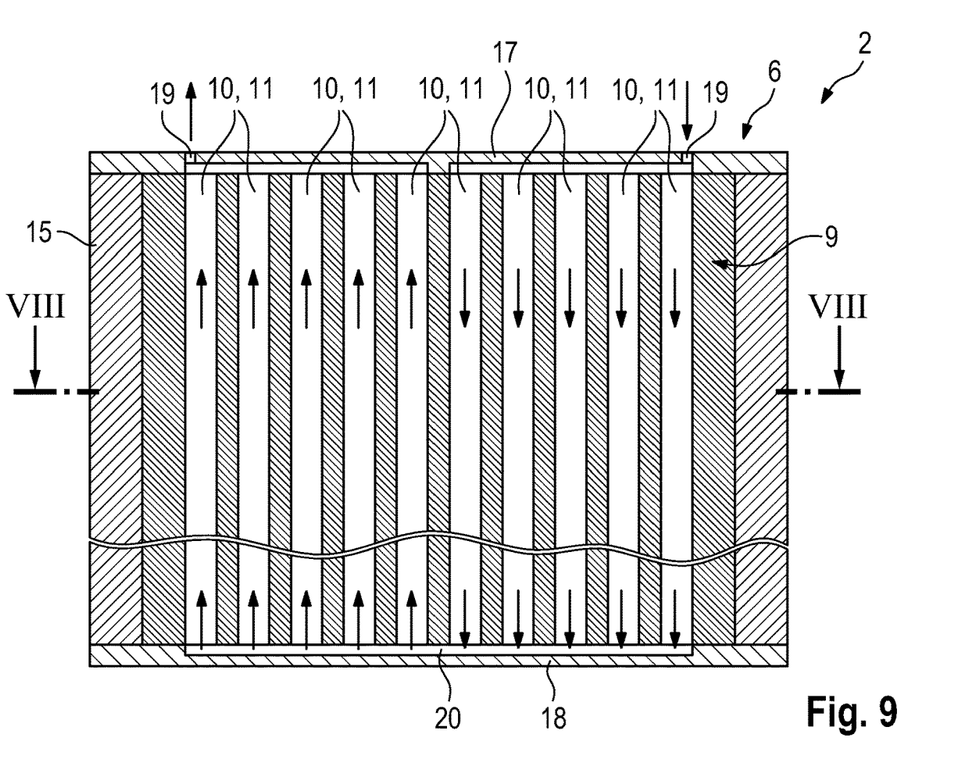
FIG. 9 shows a sectional illustration according to line IX-IX in FIG. 8 of the fourth exemplary embodiment of a battery module.

The fourth exemplary embodiment according to FIGS. 8 and 9 differs from that according to the third exemplary embodiment in that, in accordance with the arrangement of the additional component 9 which is associated with the lower wall section, a further additional component 9 is provided which is connected to the battery module housing 6 in the region of the upper wall section 14. Just like the lower additional component 9, this additional component 9 is inserted into the associated recess 16 of the battery module housing 6 from the outside and is fixedly connected to the battery module housing 6.

Therefore, all embodiments allow an individual, thermally optimized duct geometry. Deflections of the medium are possible. Simple modification of the end plates can result in the medium not being deflected.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 High-voltage energy store
2 Battery module
3 Battery frame structure
4 Battery housing cover
5 Battery housing base
6 Battery module housing
7 Battery cell
8 Main component
9 Additional component
10 Recess
11 Duct
12 Lateral wall section
13 Lateral wall section
14 Upper wall section
15 Lower wall section
16 Recess
17 End plate
18 End plate
19 Connection
20 Deflection

What is claimed is:

1. A battery module, comprising:
a battery module housing; and
a plurality of battery cells accommodated by the battery module housing,
wherein the battery module housing includes a main component for accommodating the battery cells and at least one additional component,
wherein the main component is of integral design and surrounds the battery cells from four sides,
wherein the additional component includes recesses for receiving a medium for temperature control,
wherein the recesses are closed by connecting the additional component to the main component to form media-carrying ducts,
wherein the main component is of open design on averted end sides, and
wherein the battery cells are arranged at least substantially within a space which is surrounded by the main component.

2. The battery module as claimed in claim 1, wherein the additional component has a lower thermal conductivity than the main component.

3. The battery module as claimed in claim 1, wherein the additional component is integrated into the main component in such a way that the wall thickness of the main component is reduced in the region of the additional component, and
wherein the wall thickness of the additional component, in duct-free regions of the additional component, corresponds to the reduction in thickness of the main component.

4. The battery module as claimed in claim 1, wherein the main component does not have any recesses for receiving the medium.

5. The battery module as claimed in claim 1, wherein the main component includes at least one of aluminum or an aluminum alloy.

6. The battery module as claimed in claim 1, wherein the main component is an extruded component.

7. The battery module as claimed in claim 1, wherein the battery module housing has lateral, upper, and lower wall sections, and
wherein the main component forms these wall sections.

8. The battery module as claimed in claim 1, wherein the main component separates an interior space of the battery module in which the battery cells are arranged from the medium for temperature control, and
wherein the main component is a thermal conductor.

9. The battery module as claimed in claim 1, wherein the additional component is includes at least one of aluminum, magnesium, an aluminum alloy, or a magnesium alloy.

10. The battery module as claimed in claim 9, wherein at least one of the main component or the additional component are/is produced by stamping, cold extrusion, forging, deep-drawing, milling or casting.

11. The battery module as claimed in claim 1, wherein the additional component includes at least one of plastic or fiber-reinforced plastic.

12. The battery module as claimed in claim 1, wherein the additional component has a duct geometry which is optimized in terms of flow and temperature control and has deflections.

13. The battery module as claimed in claim 1, wherein an inflow and an outflow of the temperature-control medium are arranged on the same side or on opposite sides of the battery module.

14. The battery module as claimed in claim 1, wherein the main component and the additional component are connected to one another in a cohesive manner and/or in a micro-interlocking manner.

15. The battery module as claimed in claim 1, wherein the main component and the additional component are welded to one another and/or adhesively bonded to one another.

16. The battery module as claimed in claim 15, wherein the main component and the additional component are adhesively bonded to one another by a film, a pasty, or a sprayable adhesive.

17. The battery module as claimed in claim 16, wherein the adhesive is an elastomer or a thermoset or a thermoplastic.

18. The battery module as claimed in claim 1, wherein the battery module housing has the ducts in a region of one or both lateral wall sections of the battery module.

19. The battery module as claimed in claim 1, wherein the battery module housing has the ducts in a region of an upper and/or a lower wall section.

20. The battery module as claimed in claim 1, wherein the battery module housing is closed by separate end plates arranged in a region of averted end sides of the battery module housing to form a cuboidal whole body.

21. The battery module as claimed in claim 20, wherein connections and/or deflections for the ducts are integrated into the end plates.

22. The battery module as claimed in claim 1, wherein the battery module housing has water, a water/glycol mixture, evaporating coolant, or oil as the medium for temperature control.

23. An energy store of a vehicle which can be electrically driven, comprising:
   a battery box for accommodating a plurality of battery modules,
   wherein the battery modules are configured as claimed in claim 1.

\* \* \* \* \*